(12) United States Patent
Taha et al.

(10) Patent No.: US 9,765,262 B2
(45) Date of Patent: *Sep. 19, 2017

(54) AUTOMATION AND CONTROL OF ENERGY EFFICIENT FLUID CATALYTIC CRACKING PROCESSES FOR MAXIMIZING VALUE ADDED PRODUCTS

(75) Inventors: Othman A. Taha, Dhahran (SA); M. Rashid Khan, Dhahran (SA)

(73) Assignee: SAUDI ARABIAN OIL COMPANY (SA)

( * ) Notice: Subject to any disclaimer, the term of this patent is extended or adjusted under 35 U.S.C. 154(b) by 0 days.

This patent is subject to a terminal disclaimer.

(21) Appl. No.: 13/429,047

(22) Filed: Mar. 23, 2012

(65) Prior Publication Data

US 2012/0193269 A1 Aug. 2, 2012

Related U.S. Application Data

(63) Continuation of application No. 12/266,197, filed on Nov. 6, 2008, now abandoned, which is a (Continued)

(51) Int. Cl.
*C10G 11/18* (2006.01)
*C10G 11/05* (2006.01)
(Continued)

(52) U.S. Cl.
CPC ............ *C10G 11/187* (2013.01); *C10G 11/05* (2013.01); *G05B 13/027* (2013.01); *G05B 17/02* (2013.01);
(Continued)

(58) Field of Classification Search
CPC ...... C10G 11/187; G05B 11/00; G05B 13/00; G05B 15/00
(Continued)

(56) References Cited

U.S. PATENT DOCUMENTS 4,144,189 A * 3/1979 Kirkbride ............... 208/113
4,978,440 A * 12/1990 Krambeck et al. ......... 208/113
(Continued)

OTHER PUBLICATIONS

"FCCU advanced control", Hydrocarbon Processing, Feb. 1986, p. 71-74, vol. 65, No. 2, Houston, TX, USA ("Hydrocarbon Processing").*

*Primary Examiner* — Michelle Stein
(74) *Attorney, Agent, or Firm* — Bracewell LLP; Brad Y. Chin

(57) ABSTRACT

Petroleum oil is catalytically cracked by contacting oil with catalyst mixture consisting of a base cracking catalyst containing an stable Y-type zeolite and small amounts of rare-earth metal oxide, and an additive containing a shape-selective zeolite, in an FCC apparatus having a regeneration zone, a separation zone, and a stripping zone. Production of light-fraction olefins is maximized by applying appropriate process control, monitoring, and optimizing systems. Mathematical process models, including neural networks, statistical models and finite impulse models are used in conjunction with advanced controllers and optimizing routines to calculate optimal settings for various parameters. Process model and historical data to test a predictive system can provide early warning of potential performance degradation and equipment failure in the FCC unit, decreasing overall operating costs and increasing plant safety.

18 Claims, 4 Drawing Sheets

Related U.S. Application Data continuation-in-part of application No. 11/983,078, filed on Nov. 7, 2007.

(60) Provisional application No. 60/857,300, filed on Nov. 7, 2006.

(51) Int. Cl.
*G05B 13/02* (2006.01)
*G05B 17/02* (2006.01)

(52) U.S. Cl.
CPC ............... *C10G 2300/107* (2013.01); *C10G 2300/1059* (2013.01); *C10G 2300/301* (2013.01); *C10G 2400/20* (2013.01)

(58) Field of Classification Search
USPC .................................. 208/113, 114, 120.01
See application file for complete search history.

(56) References Cited

U.S. PATENT DOCUMENTS

| | | | | |
|---|---|---|---|---|
| 4,992,614 A | * | 2/1991 | Rodewald | 208/113 |
| 5,402,333 A | * | 3/1995 | Cardner | 700/31 |
| 5,904,837 A | * | 5/1999 | Fujiyama | 208/113 |
| 6,566,293 B1 | * | 5/2003 | Vogt et al. | 502/67 |
| 6,656,346 B2 | * | 12/2003 | Ino et al. | 208/120.01 |

* cited by examiner

AUTOMATION AND CONTROL OF ENERGY EFFICIENT FLUID CATALYTIC CRACKING PROCESSES FOR MAXIMIZING VALUE ADDED PRODUCTS

RELATED APPLICATIONS

This application is a continuation of U.S. Non-Provisional Patent Application Ser. No. 12/266,197, filed on Nov. 6, 2008, which is a continuation in part of U.S. Non-Provisional Patent Application Ser. No. 11/983,078, filed Nov. 7, 2007, and U.S. Provisional Patent Application Ser. No. 60/857,300, filed Nov. 7, 2006, all of which are incorporated herein by reference in their entirety.

TECHNICAL FIELD OF THE INVENTION

The present invention relates to the process for catalytic cracking of petroleum oil. More particularly, the present invention relates to the application of advanced process control systems to catalytic cracking of petroleum oil in order to optimize the production of light olefins in relation to energy costs.

BACKGROUND OF THE INVENTION

In typical catalytic cracking techniques, the fluid catalytic cracking unit (FCC) cracks petroleum-derived hydrocarbons using a catalyst to achieve gasoline production. Although efforts are made to reduce side effects from the reaction, a small amount of unwanted products are produced, which include: liquefied petroleum gas (LPG), cracked gas oil and the like, and coke, which is deposited on the catalyst and thereby reduces the catalyst's effectiveness. The spent catalyst is regenerated by burning away the deposited coke using air and heat before the catalyst is recycled back into the process.

However, in recent years, there has been a shift towards using FCC units as a means for producing light olefins, such as propylene, rather than for primarily producing gasoline. Utilizing an FCC unit in this manner can be economically advantageous, particularly when the oil refinery is highly integrated with other steps throughout the oil production process.

Earlier methods for producing light-fraction olefins by an FCC unit using heavy-fraction oils included contacting feed oil with a catalyst for a short time (U.S. Pat. Nos. 4,419,221; 3,074,878; and 5,462,652; and European Patent No. EP 315,179A), carrying out the cracking at high temperatures (U.S. Pat. No. 4,980,053), and using pentasil-type zeolites (U.S. Pat. No. 5,326,465 and Japanese Patent National Publication (Kohyo) No. Hei JP 7-506389).

However, the methods taught by the above references failed to produce sufficient light-fraction olefins selectively. For example, the methods taught by using a reduced catalyst contact time resulted in a decrease in the conversion of light-fraction olefins to light-fraction paraffins due to the methods' inhibition of a hydrogen transfer reaction. Furthermore, the lack of hydrogen transfer also led to a decrease in the conversion of heavy-fraction oils to light-fraction oils. The method teaching the use of the high temperature cracking reaction resulted in a concurrent thermal cracking of heavy-fraction oils, which thereby increased the yield of low-value, dry gases. Lastly, the use of pentasil-type zeolites enhanced the yield of light-fraction hydrocarbons by excessively cracking the gasoline. Therefore, there was still a need to produce a light-fraction olefin without causing unwanted side effects.

U.S. Pat. No. 6,656,346 ('346) discloses an improved process for the fluid catalytic cracking of a heavy-fraction hydrocarbon to produce a high yield of light-fraction olefins, while simultaneously producing a diminished amount of unwanted dry gases. The process of '346 achieves its objective by contacting the heavy-fraction oil with a catalyst mixture that consists of a specific base cracking catalyst and an additive containing a shape-selective zeolite at a high temperature. Furthermore, '346 discloses that the catalyst mixture preferably contains between 60-95 wt % of the base cracking catalyst, with the additive making up the remainder. Additionally, the base cracking catalyst contains an ultra stable Y-type zeolite that has less than 0.5 wt % of rare-earth metal oxide.

Moreover, '346 teaches that in the reaction zone, the fluid catalytic cracking may be affected within a fluid bed, in which the catalyst particles are fluidized with the heavy-fraction oil, or, may be effected by employing so-called riser cracking, in which both the catalyst particles and the heavy-fraction oil ascend through a pipe, or, so-called down flow cracking in which both the catalyst particles and the heavy-fraction oil descend through a pipe. '346 goes on to teach down-flow type reaction zones are preferable over up-flow reaction zones in order to reduce the deleterious effects of back-mixing that occurs in up-flow reaction zones.

In spite of this breakthrough, the method taught by '346 has some disadvantages. Most glaringly is the difficulty in managing the multitude of variables that must be observed and manipulated throughout the production cycle. Since the crude oil feed varies in composition, it can be extremely challenging for operations personnel to manually test the properties of the incoming stream and adjust the necessary variables accordingly. Furthermore, because the process taught by the prior art is complicated and contains a variety of manipulatable variables, it is virtually impossible for an operator to manually control the process, even with remote access via a computer, and achieve an optimum yield of light olefins. Additionally, typical numerical methods and statistical analysis do not provide an acceptable level of process control. Consequently, the methods taught by the prior art do not teach a method for carrying out the process in an efficient manner and ensuring that the yield of light-fraction olefins has been maximized. Furthermore, no methods teach optimizing the production of light-fraction olefins in relation to energy usage.

SUMMARY OF THE INVENTION

The process of the present invention satisfies at least one of these needs. One embodiment of the present invention optimizes light olefin production, particularly propylene, in relation to energy usage for an FCC process by employing advanced process control, monitoring, and optimizing systems. In one embodiment of the present invention, process model and historical data are used in a predictive system to provide an early warning of potential equipment failure throughout the FCC unit. The present invention provides mathematical process models, including: neural networks, statistical models and finite impulse models. These various mathematical process models are used in conjunction with advanced controllers and optimizing routines to calculate optimal settings for various process parameters. Furthermore, in an embodiment of the present invention, a microwave based system is employed for optimizing the performance of a stripping zone, which further optimizes catalyst regeneration.

In one embodiment of the present invention, a process for the fluid catalytic cracking of a hydrocarbon feedstock includes the steps of reacting the hydrocarbon feedstock with a catalyst mixture in a continuous fashion in a reaction zone under reaction conditions to form a produced mixture, the produced mixture having a product stream and a spent stream, the catalyst mixture having a base cracking catalyst, an ultra stable Y-type zeolite, an unreacted catalyst stream, and a regenerated catalyst stream. The catalyst mixture having a catalyst feed rate, the hydrocarbon feedstock having a hydrocarbon feedstock feed rate, and the produced mixture having a produced mixture flow rate. Additionally, the reaction zone contains flow rate sensors, temperature sensors, control valves and a reactor. The flow rate sensors are operable to monitor the hydrocarbon feedstock feed rate, the catalyst mixture feed rate, and the produced mixture flow rate. The temperature sensors are operable to measure temperature within the reaction zone. The control valves are integrated with a process control system such that the process control system is operable to modify an amount of closure of the control valves such that the hydrocarbon feedstock feed rate, the catalyst mixture feed rate and the produced mixture flow rate are subject to manipulation. Furthermore, the reaction conditions include an operating temperature and a contact time of approximately 0.5 to 3 seconds. Following the reaction of the hydrocarbon feedstock and catalyst mixture, the produced mixture is separated into the product stream and the spent stream, with the spent stream being made up of spent catalyst and unreacted hydrocarbon. The spent stream is separated into spent catalysts and unreacted hydrocarbon, with the spent catalysts being transferred to a regeneration zone having a catalyst regenerator, where the spent catalysts are regenerated using an oxidation treatment to create the regenerated catalyst stream. The regenerated catalyst stream has decreased amounts of adsorbed material as compared to the spent catalyst. The spent catalyst has a flow rate and a residence time within the regeneration zone. The regenerated catalyst stream is recycled into the reaction zone, with the recycle rate being dependent on the regenerated catalyst stream's flow rate.

The process control system (PCS) is operable to control operating conditions of the FCC unit via control parameters. These control parameters include: obtaining predetermined process models; monitoring feed data, products characterization data, and operating conditions; selecting one of the predetermined process models based on the monitored feed data, monitored products characterization data and monitored operating conditions; selecting one of the predetermined process models based on the monitored feed data, monitored products characterization data and monitored operating conditions; calculating simulated-optimized-operating conditions using the selected predetermined process model; adjusting the operating conditions to correspond with the simulated-optimized-operating-conditions; measuring a propylene concentration in the product stream; measuring energy usage of the fluid catalytic cracking unit; comparing the propylene concentration with a predetermined propylene concentration range; comparing the energy usage of the fluid catalytic cracking unit with a predetermined energy usage range; and adjusting the operating conditions until propylene concentration falls within the predetermined minimum propylene specification to yield optimized propylene production. In one embodiment of the present invention, the optimized propylene production is defined as maximizing the ratio of propylene production over energy usage, with the energy usage being the energy consumed by the FCC unit.

The predetermined process models are operable to simulate operating conditions and produce simulated propylene production and simulated energy usage for the fluid catalytic cracking unit, wherein each predetermined process model is developed to simulate the fluid catalytic cracking unit for a specific range of operating conditions. The propylene concentration is compared with the predetermined propylene concentration range to determine whether the propylene concentration falls within the predetermined propylene concentration range. The energy usage of the FCC unit is compared with the predetermined energy usage range to determine whether the energy usage falls within the predetermined energy usage range.

BRIEF DESCRIPTION OF THE DRAWINGS

So that the manner in which the above-recited features, advantages, and objectives of the invention, as well as others that will become apparent, are attained and can be understood in detail, more particular description of the invention briefly summarized above may be had by reference to the embodiments thereof that are illustrated in the drawings that form a part of this specification. It is to be noted, however, that the appended drawings illustrate only preferred embodiments of the invention and are, therefore, not to be considered limiting of the invention's scope, for the invention may admit to other equally effective embodiments.

DETAILED DESCRIPTION OF THE INVENTION

The invention will be described below in more detail.
Neural Networks Modeling

Without loss of generality, a nonlinear system can be defined as $$y(t)=f[Y(t-1),Y(t-2),\ldots,Y(t-n_y), U(t-1), U(t-2),\ldots U(t-n_u)]+e(t) \quad (1)$$

where $n_y$ and $n_u$ are the maximum lags in the output vector and the input vector e(t) is the noise. The MLP network for constructing the system mapping $f(\bullet)$ is shown in FIG. 1.

Figure 1:
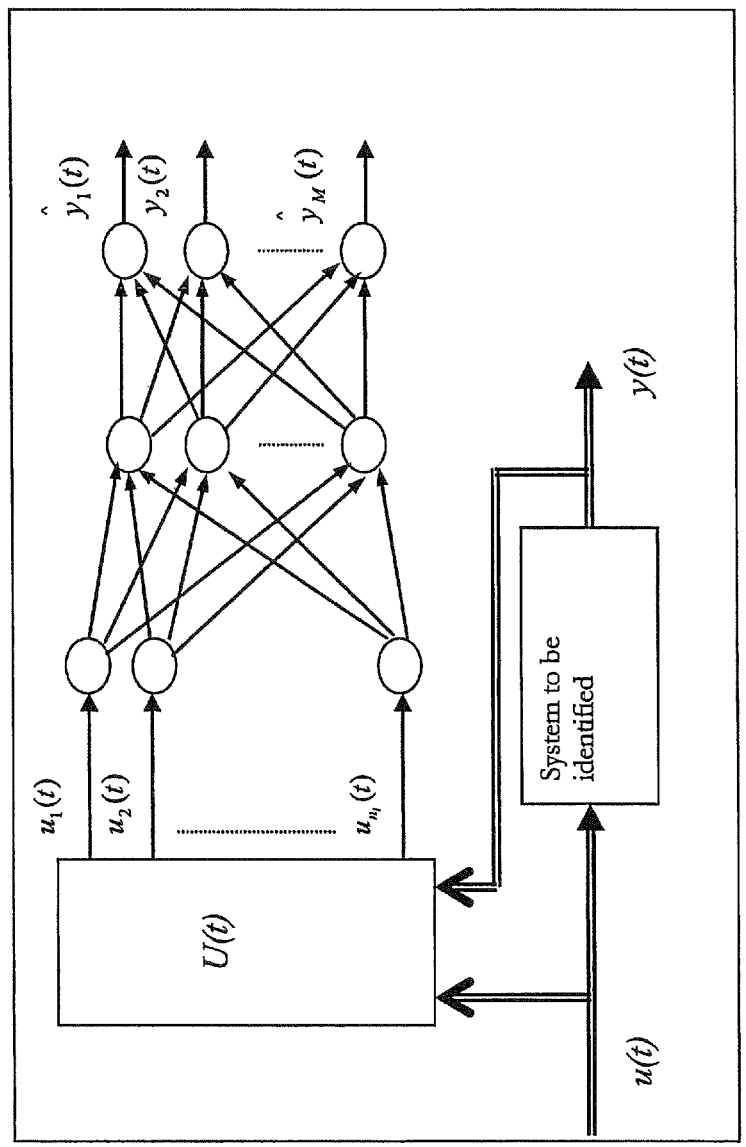
FIG. 1 is a network for constructing system mapping.

FIG. 1 shows three layers, but more layers are a direct generalization. The input layer has $n_i = n_y M + n_u N$ neurons, where M is the number of outputs and N is the number of inputs. The input vector is then defined as below:

$$U(t) = [u_1(t), u_2(t), \ldots, u_{n_i}(t)]^T \quad (2)$$
$$= [Y^T(t-1), Y^T(t-2), \ldots, Y^T(t-n_y),$$
$$U^T(t-1), U^T(t-2), \ldots U^T(t-n_u)]^T.$$

Thus, the input vector of the network consists of the past values of the network and output vector of the system. The input layer simply feeds the vector U(t) to the hidden layer without any modification. The hidden layer has user-defined $n_h$ neurons with nonlinear transfer functions (such as sigmoid function). The output of the network is represented as:

$$\hat{y}_j^{(l)}(t) = g_k\left(\sum_{j=1}^{n_h} w_{ji}^{(l)} q_i^{(l-1)}(t) + \beta_j^{(l)}\right) \quad (3)$$

where $W_{ij}^l$ is the synaptic weight of the neuron j in layer l that is fed from neuron i in layer l–1, $q_i(t)$ is the output signal of function signal of neuron i in the previous layer l–1, $\beta_j^{(l)}$ is the basis function of neuron j in layer l and $g_k(\bullet)$ is the activation function. Clearly the output vector provided by the network is:

$$\hat{Y}(t)=[\hat{y}_1(t), \hat{y}_2(t), \ldots, \hat{y}_M(t)] \quad (5)$$

and the error is defined as:

$$E(t)=Y(t)-\hat{Y}(t) \quad (6)$$

The weights are updated by using a back propagation algorithm. It is expressed as follows:

$$w_{ji}^{(l)}(t+1)=w_{ji}^{(l)}(t)+\eta\delta_j^{(l)}(t)q_i^{l-1}(t) \quad (7)$$

where the $\delta_j$ for the neuron j in output layer L and in hidden layer l are given by (8) and (9) respectively.

$$\delta_j^{(l)}(t) = -2e_j^L(t)\left[g_j\left(\sum_{j=1}^{n_h} w_{ji}^{(L)}(t)q_j^{(L-1)}(t) + \beta_j^{(L)}(t)\right)\right]' \quad (8)$$

$$\delta_j^{(l)}(t) = \left[f_j\left(\sum_{i=1}^{r_i} W_{ji}^l(t)q_j^{l-1}(t) + \beta_i^{(1)}(t)\right)\right]' \sum_{k=1}^{M} \delta_k^{(l+1)}(t)W_{kj}^{(l+1)}(t) \quad (9)$$

The biases can be updated by using the following expressions $$\beta_j^{(l)}(t+1)=\beta_j^{(l)}(t)+\delta_j^{(l)} \text{ for } h=1, 2 \quad (10)$$

Feed-Forward Neural Networks (FFNN)

The use of feed-forward neural networks (FFNN) in system identification has been growing in recent years. In 1990, Narendra and Parthasarathy demonstrated that FFNN could be used effectively for identification and control. They applied both static and dynamic back propagation methods for the adjustment of network parameters. The same year, Bhat, Minderman, McAvoy and Wang used neural networks for modeling nonlinear chemical process systems such as a steady-state reactor and a dynamic pH continuously stirred tank reactor. Bhat et al. used the back-propagation algorithm for interpreting biosensor data by utilizing FFNN modeling. In 1991, Tai, Helen, Ryaciotaki and Hollaway presented a survey report on the algorithms and techniques of neural networks implemented in the areas of identification, robotics, detection, adaptive control, modeling and optimization. Tai et al. discussed five algorithms used by researchers to train neural networks for identification and control. The five algorithms included: supervised learning, inverse dynamics, stabilization, propagation through time, and adaptive critic systems. Lee, Park, Kishan, Chilukuri and Ranka compared the performance of FFNN and RNN (recursive neural networks) in system identification and inverse system identification by simulation. Both of these networks were used to build an emulator for a simple, nonlinear gantry crane system and also to calculate the inverse dynamics of the system.

The lack of generic and efficient methodology for nonlinear system identification with an unknown system architecture prompted Qin, Su and McAvoy to re-derive pattern learning and batch learning rules for both FFNN (multilayer perceptrons) and RNN respectively. This was one of the pioneering works in black box modeling vis-à-vis neural networks. Chen and Mars discussed the feasibility of using MLP neural networks for system identification. They scrutinized the work of Narendra et al. and provided some solutions to the constraints pointed out in that work. Stader compiled most of the learning strategies and neural network architectures and discussed their theoretical foundations and limitations in the areas of prediction and modeling. In 1993, Yamada and Yabuta proposed practical design methods for the identification of both the direct and inverse transfer functions of a nonlinear dynamic system through the use of neural networks. In 1994, Sjoberg utilized FFNN based NNARX modeling techniques to simulate different nonlinear systems having different kinds of non-linearities.

Definitions

As used herein, neural network (NN) is an interconnected group of artificial neurons that uses a mathematical or computational model for information processing based on a connectionistic approach to computation. In most cases an NN is an adaptive system that changes its structure based on external or internal information that flows through the network. Other common names for a neural network include artificial neural network (ANN) and simulated neural network (SNN).

As used herein, the term fluid catalytic cracking (FCC) indicates that heavy-fraction oil is continuously brought into contact with a catalyst that is kept in a fluidized state in order to crack the heavy-fraction oil, thereby producing light-fraction hydrocarbons, comprising mainly gasoline and light-fraction olefins.

As used herein, "reaction outlet temperature" is defined as an outlet temperature of the up flow-type reaction zone, and it is the temperature before separation of the cracked products from the catalysts.

As used herein, catalyst/oil ratio is a ratio of the amount of the catalyst mixture recycled (ton/hr) to a rate of the feed oil fed (ton/hr).

Brief Overview of Apparatus and Process

The FCC apparatus that can be used in this invention has a regeneration zone (a regenerator), an up flow-type reaction zone (a riser reactor), a separation zone (a separator), and a stripping zone (a stripper). The reaction zone is also equipped with multiple sensors to monitor the product and feed composition on-line and is integrated with a control system, as well as means to control catalyst loading and discharge in real-time based on reactor performance.

In the reaction zone, heavy-fraction oil is continuously brought into contact with a catalyst mixture, which is maintained in a fluidizing state, to crack the heavy-fraction oil and thereby produce light-fraction hydrocarbons, which are mainly comprised of light-fraction olefins. A mixture of catalysts, hydrocarbon gas, which contains products obtained by the catalytic cracking, and un-reacted materials are forwarded into the separation zone, wherein most of the catalyst is separated from the mixture.

The separated catalysts are then forwarded to the stripping zone, wherein most of the adsorbed material on the catalyst is removed. The stripped catalysts, along with a small portion of heavy hydrocarbons, are forwarded to the regeneration zone, wherein the stripped catalysts are subjected to an oxidation treatment, further decreasing the amount of adsorbed material, and yielding regenerated catalysts. These regenerated catalysts are continuously recycled to the reaction zone.

Feed Oil

In the FCC unit of this invention, heavy-fraction oil is used as feed oil. The heavy-fraction oil used preferably has a boiling point, at atmospheric pressure, in the range of 250° C. or higher. The heavy-fraction oil used herein may include straight-run gas oil, vacuum gas oil, atmospheric residue, coker gas oil, or petroleum oils obtained by hydrofining or hydrotreated said residues and gas oils. These aforementioned petroleum oils may be used singly or as a mixture thereof, with a minor portion of light fraction oil.

Catalyst Design

A catalyst's physical and chemical properties contribute to increased conversion through selectivity differences. These include zeolite type, pore size distribution, relative matrix to total surface area, and chemical composition. The amount of catalyst used i.e., catalyst/oil ratio is significant for maximum olefins production.

The propylene production of a fluid catalytic cracking unit employing a large pore zeolite cracking catalyst produces more propylene by adding a cracker riser and a medium pore zeolite catalytic component to the unit, and recycling at least a portion of the cracked material to the cracker riser. The large pore size zeolite preferably comprises an ultra stable Y-type zeolite and the medium pore size is preferably ZSM-5.

At least a portion of the hydrocarbon is converted to produce an olefin having about two to about three carbon atoms per molecule. The large pore zeolite component is preferably a faujasite type and more preferably a Y type faujasite. The medium pore zeolite component is preferably a ZSM-5 type. In addition to the large and medium pore size zeolite components, the catalyst can also include at least one porous, inorganic refractory metal oxide as a binder. It is preferred that the binder have acid cracking functionality, for cracking the heavier components of the FCC feed and that the medium pore size zeolite component comprise at least 1 wt % of the catalyst, on a total weight basis.

In another embodiment, the catalyst can include large pore size zeolite particles and medium pore size zeolite particles. Both the large and medium pore size zeolite particles are composite materials with a porous, inorganic refractory metal oxide binder. In another embodiment, the zeolite-containing catalyst typically includes at least 0.5 wt % to about 10 wt % phosphorus and about 0.1 wt % to about 10 wt % of a promoter metal selected from the group consisting of gallium, germanium, tin and mixtures thereof.

The zeolite can be treated with about 10 wt % of the phosphorus-containing compound, (calculated as $P_2O_5$) based on the total amount of olefin-selective zeolite, to ensure proper light olefin selectivity. After treatment with the phosphorus-containing compound, the treated olefin-selective zeolite is dried and subsequently calcined at a temperature between 300° C. and 1000° C., preferably between 450° C. and 700° C. for about 15 minutes to 24 hours, to prepare the suitable olefin-selective "cracking catalyst."

The catalysts on which carbonaceous materials, and a portion of heavy hydrocarbons, are deposited, are forwarded from the stripping zone to the regenerating zone. In the regenerating zone, the catalysts, on which the carbonaceous materials and the like are deposited, are subjected to oxidation treatment, to decrease the amount of the deposits, thereby obtaining regenerated catalysts. These regenerated catalysts are continuously recycled to the reaction zone. The cracked products are quenched just upstream of, or just downstream of, the separator, in order to avoid unnecessary further cracking or excessive cracking.

The catalyst mixture which is used in this invention can contain a base cracking catalyst and an additive. In one embodiment, the base cracking catalyst includes a stable Y-type zeolite, which is the main active component of the base catalyst, and a matrix, which is a substrate material for the zeolite. The base cracking catalyst contains less than 0.5 wt % of rare-earth metal oxide that is mainly included in the ultra stable Y-type zeolite. Generally, catalytic activity of stable Y-type zeolites increases as the rare-earth metal content in the zeolites increases because thermal stability of the ultra stable Y-type zeolite is improved by incorporating rare-earth metal into the zeolites.

Hydrogen transfer reaction activity of the Y-type zeolites is also increased by adding rare-earth metal to the zeolites. The content of the stable Y-type zeolite in the base cracking catalyst used in this invention is preferably in a range of 5 to 50 wt %, more preferably in the range of 15 to 40 wt %. The term "stable" Y-Type zeolite includes such zeolite material such as "ultrastable" zeolitic materials.

The matrix of the base cracking catalyst used in this invention may include clays such as kaolin, montmorilonite, and bentonite, and inorganic porous oxides such as alumina, silica, magnesia, and silica-alumina. The base cracking catalyst used in this invention preferably has a bulk density of 0.5 to 1.0 g/ml, an average particle diameter of 50 to 90 microns, a surface area of 50 to 350 $m^2$/g, and a pore volume of 0.05 to 0.5 ml/g.

The catalyst mixture used in this invention contains, in addition to the base cracking catalyst, an additive containing a shape-selective zeolite. The shape selective zeolite referred to herein means a zeolite whose pore diameter is smaller than that of the Y-type zeolite so that hydrocarbons with only limited shape can enter the zeolite through its pores. Examples of the shape-selective catalysts are: ZSM-5, omega, SAPO-5, and aluminosilicates. Among these shape-selective zeolites, ZSM-5 zeolite is most preferably used in this invention. The content of the shape-selective zeolite in the additive used in this invention is preferably in the range of 20 to 70 wt %, more preferably in the range of 30 to 60 wt %.

A percentage of the base cracking catalyst in the catalyst mixture used in this invention is in a range of 60 to 95 wt %, and a percentage of the additive in the catalyst mixture used in this invention is in a range of 5 to 40 wt %. If the percentage of the base cracking catalyst is lower than 60 wt % or the percentage of additive is higher than 40 wt %, high light-fraction olefin yield cannot be obtained, because of low conversions of the feed oil. If the percentage of the base cracking catalyst is higher than 95 wt %, or the percentage of the additive is lower than 5 wt %, very high light-fraction olefin yield cannot be obtained, while high conversion of the feed oil can be achieved. In a particularly preferred embodiment, the catalyst contains at least 0.5 wt. % P, typically present as $P_2O_5$.

In this invention, commercially available "cracking catalyst" such as OCTACAT (W. R. Grace Co., Ltd.) can be used. The OCTACAT contained a zeolite having a crystal lattice constant of 24.50 Å. Other suitable commercially available "cracking catalysts" include the following name or brands: Akzo Novel, Engelhard, DuPont, HARMOREX (CCIC), OlefinsMAX (by Davison), Tosco, etc., Stone & Webster, UOP and others.

Catalyst Oil Ratio

Increasing the concentration of catalyst, often referred to as catalyst/oil ratio, in the reaction zone will increase the availability of cracking and result in maximum conversion. In the present invention, increasing the catalyst/oil ratio can be achieved by either increasing the reaction zone heat load or switching to a lower coke selective catalyst (i.e., lower delta coke). Reaction zone heat load can be raised by increasing the reactor temperature or by lowering feed rate.

In an embodiment of the present invention, the catalyst/oil ratio can be in the range of 10 to 40 wt/wt, preferably in the range of 20 to 30 wt/wt. If the catalyst/oil ratio is less than 15 wt/wt, a catalyst-dense-phase temperature in the regeneration zone will arise, caused by the local heat balance. This in turn accelerates the deactivation of the catalyst simultaneously with the feed oil being brought into contact with those catalyst particles having the higher temperature, which in turn increases thermal cracking and leads to an increased amount of unwanted dry gases.

Furthermore, if the catalyst/oil ratio exceeds 40 wt/wt, the handling capacity of the regeneration zone will need to be increased to handle a larger volume of recycled catalyst in order to provide the optimal catalyst residence time therein.

Carbon on Regenerated Catalyst

The lower the carbon on regenerated catalyst, CRC, the higher the availability of cracking sites since less coke is blocking acid cracking sites. CRC is reduced by increasing regeneration efficiency through the use of carbon monoxide oxidation promoters. Increased regenerator bed levels also improve CRC through increased residence time but this must be traded off with reduced dilute phase disengager residence time and the possibility for increased catalyst losses.

Catalyst Feed Rate

The catalyst is added periodically in this invention to the FCC unit based on a predefined production schedule. The timing and quantity of catalyst injected can be pre-programmed into the controller with provisions for augmentation during operation of the FCC process to optimize the production yield, product mix or emissions control. However, due to the uncertainties of the production process, such as: chemical make-up of the oil feed stock and other variations entering the FCC system, emissions, and energy use, the product mix may vary or drift from process targets during the course of fluid-cracking.

In one embodiment of the present invention, the catalyst feed rate is controlled and monitored by a monitoring system. However, the feed rate is dependent on the feed composition, and the optimum feed rate is predicted by the model.

Reaction Time

An increase in reaction time available for cracking also increases conversion. Fresh feed rate, riser steam rate, recycle rate and pressure are the primary operating variables that affect reaction time for a given unit configuration. Conversion varies inversely with the rate due to limited reactor size available for cracking. Conversion has been observed in some units to increase by only 1% absolute for a 3 to 5% relative decrease in fresh feed rate. The contact time referred to herein means either the time between the start of contact of the feed oil with the regenerated catalysts and the separation of the produced cracked products from the catalysts, or the time between the start of contact of the feed oil with the regenerated catalysts and the quenching of the produced cracked products.

In the present invention, the contact time is in the range of 0.1 to 1.0 seconds, preferably in the range of 0.2 to 0.7 seconds. If the contact time is less than 0.1 seconds, then the light-fraction olefins will have a lower yield due to the low conversion of the heavy fraction oil. Conversely, if the contact time exceeds about one (1) second, then the thermal cracking of petroleum oil fed will be excessive, thereby excessively increasing the amount of dry gases generated. However, the contact time is dependent on the feed system, and the optimum reaction time is predicted by the model.

Reactor Temperature

Increased reactor temperature increases unit conversion, primarily through a higher rate of reaction for the endothermic cracking reaction and also through increased cat/oil ratio. An increase of approximately 10° F. in reactor temperature can increase conversion by about 1-2% absolute. A higher reactor temperature also increases gasoline octane and LPG olefinicity, which are very desirable side benefits of maximizing conversion via reactor temperature. The higher octane is due to the higher rate of primary cracking reactions relative to secondary hydrogen transfer reactions which saturate olefins in the gasoline boiling range, thereby lowering gasoline octane. Generally, an increase of approximately 10° F. in reactor temperature can give up to about a 0.8 and 0.4 number increase in research and motor octane, respectively.

Under a very short residence time, the desired reaction zone outlet temperature is in the range of 570° C. to 630° C., preferably in the range of 590° C. to 620° C. If the reaction zone outlet temperature is lower than 570° C., then the light-fraction olefins will not have a high yield. Conversely, if the reaction zone outlet temperature is higher than 630° C., a significant increase in the amount of dry gases is generated due to excessive thermal cracking of the heavy fraction feed oil.

If naphtha is the feedstock for a particular application, the reaction temperature can be lowered compared to residue cracking to optimized propylene production. However, the reaction temperature and time are dependent on the feed system and the optimum conditions are predicted by the model.

Pressure

Higher conversion and coke yield are thermodynamically favored at higher pressures; however, the conversion is not significantly affected by unit pressure since a substantial increase in pressure is required to significantly increase conversion. In an embodiment of this invention, the apparatus can be operated preferably at a reaction pressure of about 1 to 3 atm and at a regenerating zone temperature of 650° C. to 720° C.

Reactor.

The fluid catalytic cracking unit is used in this certain embodiments invention can include a regeneration zone (a regenerator), an up flow-type reaction zone (a riser reactor or "riser"), a separation zone (a separator), and a stripping zone (a stripper). The reactor can also be equipped with multiple sensors to monitor product and feed composition on-line and is integrated with a control system, as well as means to control catalyst loading and discharge real-time based on reactor performance.

Heat Balance

Coke formation in an FCC unit can be the most critical parameter to maintain the heat balance. Coke produced in the riser is burnt in the presence of air in the regenerator. The heat produced through exothermic coke burning reactions supplies the heat demands of the reactor, i.e., heat of vaporization, and associated sensible heat of the feedstock, endothermic heat of cracking, etc. For example, the coke yield in a conventional FCC unit with vacuum gas oil remains can be in the range of approximately 4.5-5.5 wt %. The heat produced from complete combustion can be sufficient to supply the reactor heat load. However, in a residue FCC unit, because the feedstock contains large amounts of coke precursors with higher amounts of Conradson coke and aromatic rings, the coke formation can be significantly increased, which in turn increases the regenerator temperature from approximately 650° C.-860° C. in conventional FCC units to approximately 720° C.-250° C. in residue crackers.

Optional Advanced Energy Source

Microwave frequency ignores the catalytic cracking catalyst and preferentially excites the hydrocarbon on the spent catalyst, the stripping steam conventionally used, or both the stripping steam and the hydrocarbonaceous coke. Ultrasonic energy, such as cavitations, is also a suitable energy source for coke removal. In preferred embodiments, microwave frequencies that are selective towards polar compounds, such as sulfur and nitrogen, are used. Additionally, using cavitations to remove carbonaceous material from the catalyst will occasionally result in a beneficial cracking of the carbonaceous material; leading to an increase in desirable products.

The process of the present invention provides a means for stripping entrained hydrocarbons from the catalyst. The microwave (MW) or sonic stripping section can be easily installed in the present invention. A number of variations can be incorporated using multiple MW/Sonic sources in the stripping section. The stripping section can be optionally lined with a material that reflects the selected microwave (MW) or sonic radiation. This additional lining would ensure that the MW/Sonic energy is used for hydrocarbons and/or undesirable heteroatoms such as sulfur and nitrogen compounds, rather than be used to heat up the steel stripper vessel. In one embodiment, most of the MW/Sonic energy is focused on a relatively dense phase region of the stripper, which permits a longer residence time. Although this concept will be suitable for many installations, it should not be considered limiting.

In a preferred embodiment, the MW/Sonic stripper includes multiple stages, which give the process the ability to remove stripped products at multiple points in the stripping operation. With the ability to selectively heat hydrocarbons, and/or sulfur and nitrogen compounds afforded by the present invention, use of extremely short residence time stripping is now possible.

Stripping techniques heretofore used to de-water paper pulp are now applicable to catalytic stripping processes. In other words, subsequent to the microwave exposure, the catalyst is passed over a relatively large cross-sectional area surface with a vacuum on one side of the surface to aid in the stripping operation. In one embodiment, porous stainless steel filters can be used. In another embodiment, annular flow of catalyst around a porous stainless steel filter can be used to strip hydrocarbons and/or sulfur and nitrogen compounds from catalyst which has been exposed to MW/Sonic energy.

Control of Operating Conditions and Variables

In one aspect, the invention is aimed to "optimize propylene production," which means to "maximize propylene production at the minimum energy usage." Hydrocarbon conversion in an FCC unit can be a complicated function of many variables. For example, over-cracking of gasoline to LPG and dry gas may occur due to an increase in reactor residence time. Available approaches to offset any potential over-cracking include adding additional riser steam to lower hydrocarbon partial pressure for more selective cracking, reducing reactor pressure, increasing the recycle rate to decrease residence time, reducing the availability of catalytic cracking sites by lowering cat/oil ratio, and by combinations of the foregoing conditions.

The variables described above are generally not optimized for maximizing conversion of propylene in existing FCC units. Optimum conversion level corresponds to a given feed rate, feed quality, set of processing objectives, and catalyst at other unit constraints (e.g., wet gas compressor capacity, fractionation capacity, air blower capacity, reactor temperature, regenerator temperature, catalyst circulation). Therefore, the FCC operator needs to adjust several variables at the same time. If the, optimum conversion level is found, only then can the operator work on the suitable catalyst and perhaps redesign the catalyst properties to remove operating constraints to shift the operation to a higher optimum conversion level. However, there is lack of suitable automation process equipment that can be readily used to optimize such performance On-line Performance Monitoring Regulatory control loops serve as the foundation of the plant automation hierarchy. Maintenance and control-engineering personnel struggle to sustain the performance of the conversion assets. Equipment and technology reliability issues, changing plant business drivers, and fewer skilled resources to monitor and maintain these assets are all cited as common problems. The results include negative impacts to quality, energy consumption, equipment wear and tear, plant throughput, and ultimately, profitability. Performance monitoring will provide tools to (1) benchmark current control performance against industry standards, (2) identify & prioritize problems to focus maintenance resources, (3) analyze and diagnose problems with online and offline reports, (4) improve control performance with a complete set of tools for both regulatory and advanced controllers, and (5) monitor to sustain improvements with comprehensive, automated reporting. Tools such as Matrikon's ProcessDoctor, Honeywell's LoopScout, or Yukogawa's MD Diagnostic are examples which provide such functionalities.

Modeling and Optimization Package

Advanced software to improve throughput and control of continuous processes that have incipient disturbances can be used to optimize the FCC unit. Such software packages offer automatic control over continuous processes that are difficult to control by conventional automation techniques. There are many processes that are subject to disturbances whose onset is too fast for conventional manual or automatic control to react. The use of modeling and optimization packages results in increased throughput and reduced energy usage through superior control during normal operation, and also through avoidance or mitigation of process upsets that can shut down the process. It also requires less manual intervention from human operators responsible for the process, so they can focus their attention on higher-level production control activities. Certain embodiments of the present invention can utilize a software package, such as for example, Umetric's SIMCA P11 and the optimization tools in Matlab by MathWorks Inc.

Many of the above mentioned packages provide an optimization routine, which is defined as minimization of math functions which include representation of the process and product and energy costs.

Detection of Operating Conditions and Selection of Process Model

In one specific embodiment of the present invention, the system can use various sensor signals to determine the operating conditions and select the process model that best represents the current operations. The model can be selected from a list of previously developed process models. The selected model can then be used in the optimization algorithm to calculate the optimal process settings.

Figure 2:
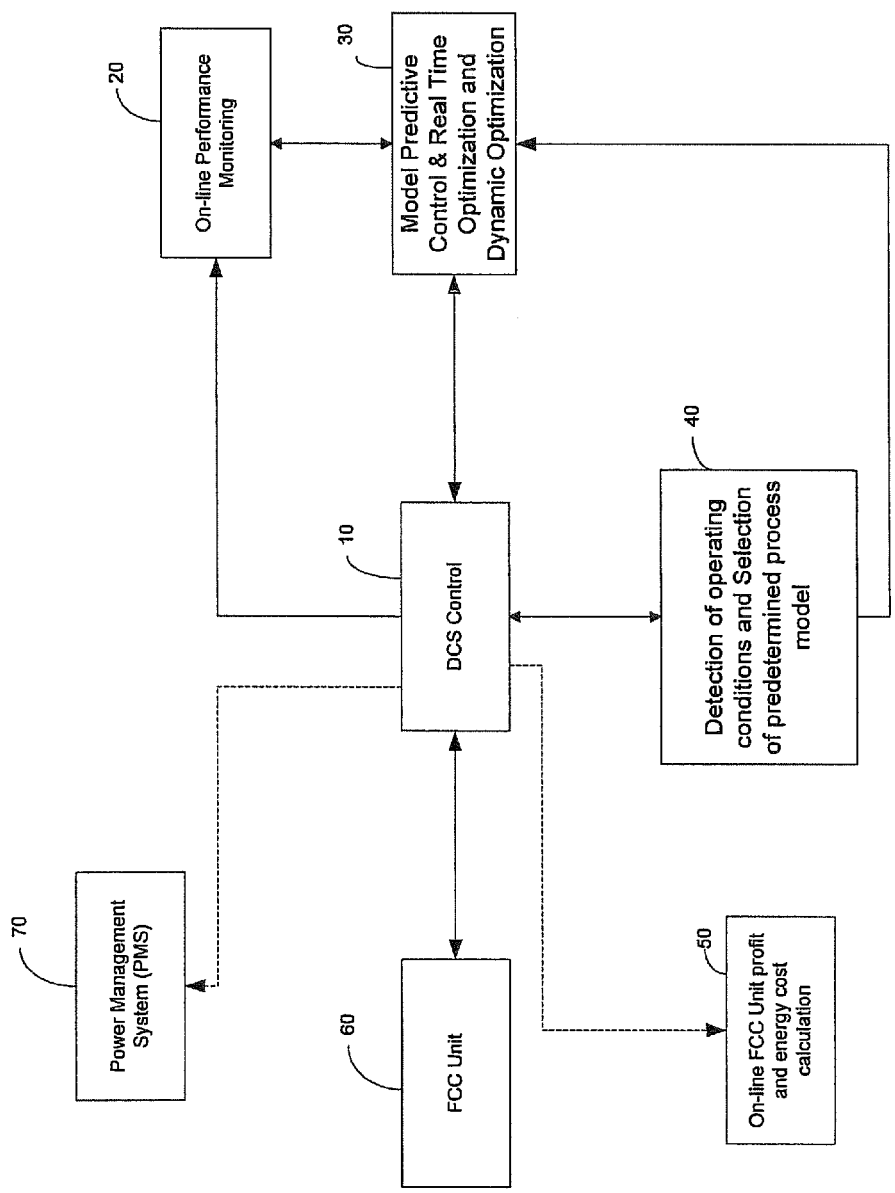
FIG. 2 is a schematic diagram of a generic fluid catalytic cracking process equipped with various control systems in accordance with one specific embodiment of the present invention.
Figure 3:
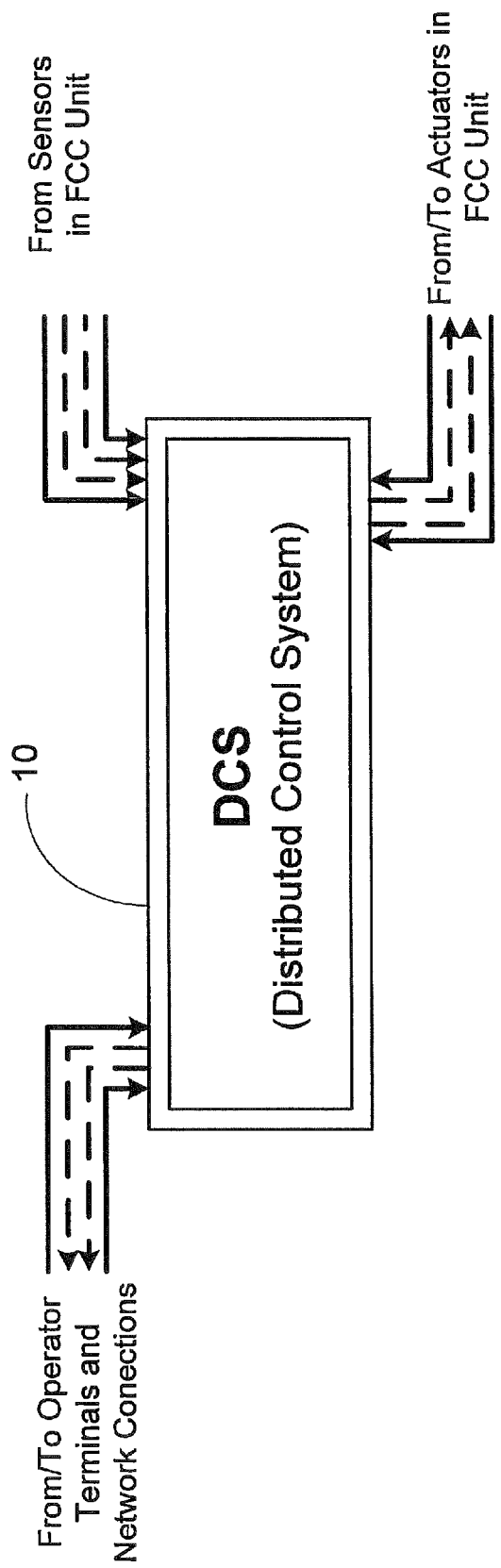
FIG. 3 is a schematic diagram of Distributed Control System utilized in one specific embodiment of the present invention.

Referring now to FIG. 2, the proposed catalytic cracking process can be optionally equipped with various control systems ("Process Control"). Further, the FCC processes can be equipped with all or some of the following features, as deemed necessary as described.

The signals from a FCC unit [60] are introduced into a Distributed Control System ("DCS") [10], a process control system that uses a network to interconnect sensors, controllers, operator terminals and actuators. A DCS [10] includes a computer and has interconnections with other systems.

Model Predictive Control ("MPC") [30], is an advanced method of process control that improves on standard feedback control by predicting how a process such as distillation will react to inputs such as heat input. This means that feedback can be relied on much less since the effects of inputs will be derived from mathematical empirical models. Feedback can be used to correct for model inaccuracies. The controller relies on an empirical model of a process obtained by plant testing to predict the future behavior of dependent variables of a dynamical system based on past responses of the independent variables. Frequently, the controller relies on linear models of the process.

Major commercial suppliers of MPC software include the AspenTech (DMC+), Honeywell (RMPCT) and Shell Global Solutions (SMOC; Shell Global Solutions inc: Carel van Bylandtlaan 23, 2596 HP, The Hague, The Netherlands).

Control Loop Performance Monitoring ("CLMP") (not shown). Performance monitoring allows (1) benchmarking current control performance against industry standards, (2) identifying & prioritizing problems to focus maintenance resources, (3) analyzing and diagnose problems with online and offline reports, (4) improving control performance with a complete set of tools for both regulatory and advanced controllers, and (5) monitoring to sustain improvements with comprehensive automated reporting. Exemplary tools such as Matrikon's ProcessDoctor (available from Matrikon's located at 10405 Jasper Avenue, Edmonton, Alberta, Canada), Honeywell's Profit Expert (available from Honeywell International Inc., 101 Columbia Road, Morristown, N.J. 07962), or Yukogawa's MD Diagnostic (Yukogawa, Musashino-shi, Tokyo, Japan) and Aspentech's (Aspen Technology, Inc., Ten Canal Park, Cambridge, Mass.) AspenWatch provide such functionalities.

Detection of operating conditions and Selection of Process Model ("SPM") [40]. This system uses sensor signals in the process to determine the operating conditions such as current feed rate, feed composition, and ambient temperature to select the process model that best represents the current operation. This selected process model can then be used in the optimization algorithm to calculate the optimal process settings. The tools can be developed in Matlab (Mathworks Inc., 3 Apple Hill Drive, Natick, Mass. 01760-2098), Visual Basic code or other software programming language.

Real Time Optimization and Dynamic Optimization ("RTO") [30]. The optimization of industrial process systems is one way of adjusting the process control variables to find the reaction conditions that achieve the highest propylene yield with minimum cost or other possible outcome. Usually, many conflicting responses must be optimized simultaneously. In the lack of systematic approaches, optimization can be done by "trial-and-error" or by changing one control variable at a time while holding the rest constant. Such methods are generally not efficient in finding the true optimum. Usually, optimization techniques involve development of rigorous process models. These mathematical models can include chemical reactions and thermodynamic equations. Exemplary tools such as PAS Inc.'s (16055 Space Center Blvd., Houston, Tex. 77062, USA) NOVA provide such functionalities. The models can be validated against plant operation data to verify the model accurately represents the plant behavior. These models are dynamic in the sense they model the time of change of process variables.

Energy Management Technology ("PMS") [70]. PMS balances energy requirements with the available energy supply, and thus prevents disturbances of operations, or even blackouts. Furthermore, the PMS can enable better control of energy costs, enhanced safety and the mitigation of environmental impacts. ABB Ltd, (Affolternstrasse 44 P.O. Box 8131, CH-8050 Zurich, Switzerland) is believed to be one provider of such technology.

Field Bus Technology ("FFS"). The field signals used in process instrumentation have been standardized, allowing control systems and field devices from a variety of suppliers can be interconnected using standard 4 to 20 mA analog signals. The FOUNDATION fieldbus™ standard developed by the Fieldbus Foundation™ constitutes the next level of standardization and it is designed to meet modern needs. In addition to having interconnectivity equivalent to that available using 4 to 20 mA analog signals in a conventional field network, FOUNDATION fieldbus™ allows multiple devices to be connected to a single FOUNDATION fieldbus™, permits the interactive communication of various types of information, and enables the distribution in the field of intelligent functions including self-diagnostics and control functionality. The focus is on its ability to transmit various types of information in addition to field signals and to distribute intelligence to distributed field devices. These features enable remote monitoring, real-time self-diagnostics, and proactive maintenance of field devices, as well as plant resource management using field communication. This can greatly reduce operating instrumentation systems costs. Emerson Corporate, (P.O. Box 4100, 8000 West Florissant Avenue, St. Louis, Mo.) is an exemplary provider of these technologies.

FCC Unit Profit and Energy Cost Calculation ("FUPEC") [50] includes calculations that allow for using various process data, such as for example, FCC steam, catalyst, electricity and products costs to be monitored and/or calculated, thereby allowing for real-time monitoring the dollar cost per unit of products generated by the FCC unit.

In certain embodiments, the processes can be automatically monitored and adjusted as necessary. The performance monitoring of the proposed high severe fluid catalytic cracking conversion process can provide tools to: (a) benchmark current control performance against desired standards; (b) analyze and diagnose problems with online monitoring and control; (c) improve control performance with a complete set of advanced controllers and tools; (d) monitor to sustain improvements with comprehensive, automated reporting; and (e) remotely monitor using multiple sensing units and make adjustments on catalyst injections and other operating conditions to the system outputs while reducing the reliance on human interactions such as monitoring and manual changes to the catalyst injection schedule and other process variables. Such systems can be built by many commercial venders, such as those identified above, and can be integrated into the FCC unit [60]. In certain embodiments the monitoring systems can include sensors which may be positioned throughout the FCC unit [60] to monitor feed and product characteristics and reaction conditions. In certain embodiments, the sensors can communicate with the DCS control system [10] via hard wired connections to the system. In certain other embodiments, the sensors can be configured to communicate with the DCS control system [10] via wireless or RFID communication means. Thus, as shown in FIG. 4, while the DCS unit is not shown to be hardwired the flow control valves or sensors present in the FCC unit [60], it is understood that the DCS [10] is operatively coupled to the FCC unit [60].

Figure 4:
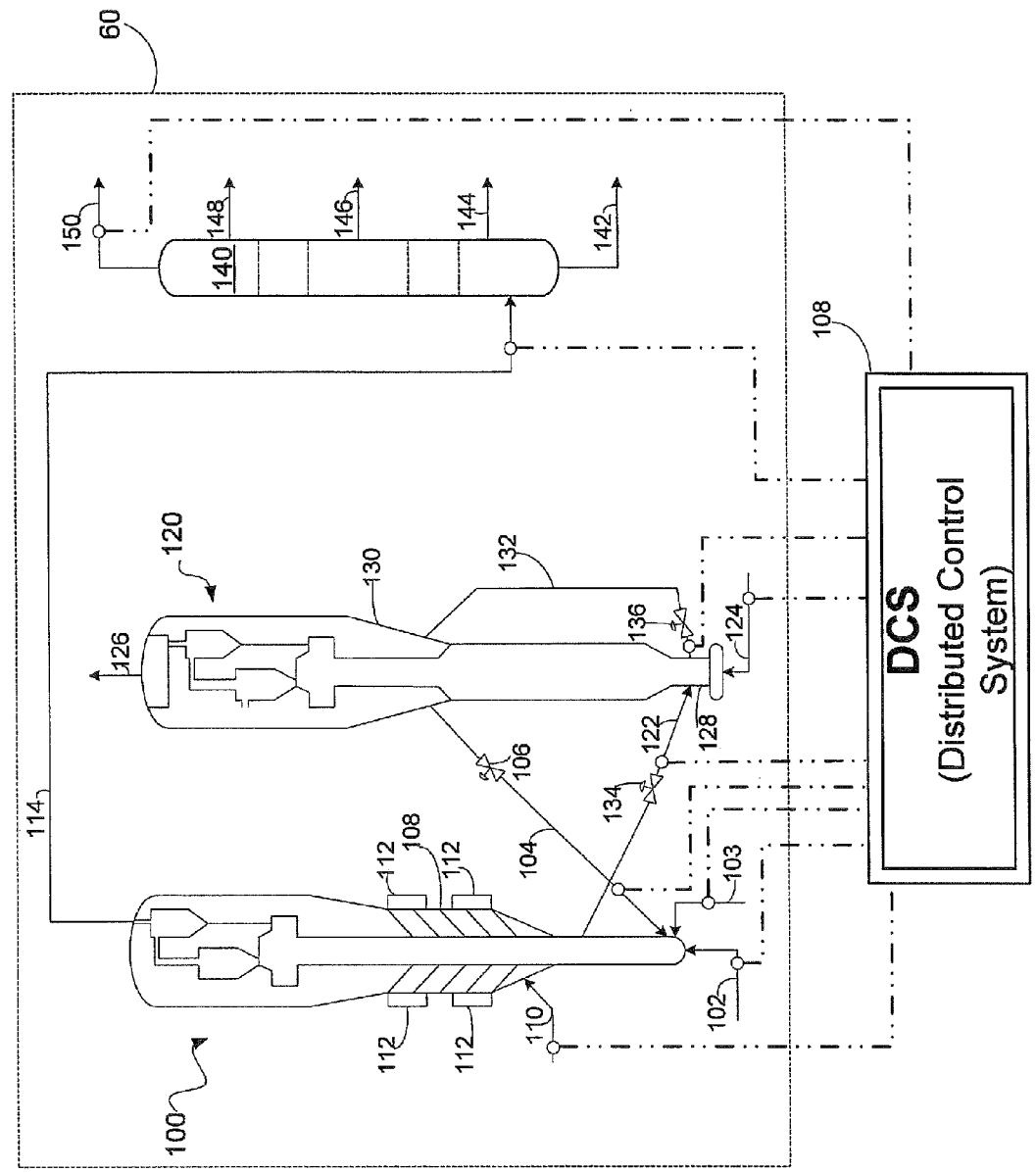
FIG. 4 is a schematic flow diagram of a generic fluid catalytic cracking process equipped with various control systems in accordance with one specific embodiment of the present invention.

Referring now to FIG. 4, hydrocarbon feedstock [102] is charged to the bottom of reaction zone [100]. Hot regenerated catalyst stream is added via conduit [104], equipped with a regenerated catalyst control valve [106]. A lift gas can be introduced near the liquid and solid feed inlets by means not shown. Additionally, an optional fresh catalyst stream can be added via conduit [103]. The hydrocarbon feedstock vaporizes and forms a dilute phase suspension with the FCC catalyst. The suspension passes up the reaction zone [100], which generally gets wider to accommodate volumetric expansion. Cracked products and coked catalyst may pass into a solid-vapor separation means, such as a conventional cyclone.

A means for stripping entrained hydrocarbons from the catalyst is provided in stripper [108]. Preferably some conventional stripping steam is added via line [110]. The microwave (MW) or a sonic stripping section [112] shown in FIG. 4 is a simple representation of an embodiment of the present invention. A number of variations can be incorporated using multiple MW/Sonic sources as shown by [112] which radially apply the energy in the stripping section.

The stripper [108] is optionally lined with a material which reflects the selected microwave (MW) or sonic radiation, to ensure that the MW/Sonic energy is used for the hydrocarbons, and undesirable heteroatoms such as and sulfur and nitrogen compounds, and not wasted in heating up the steel stripper vessel.

In one embodiment of the present invention, most of the MW/Sonic energy is applied in a relatively dense phase region of the stripper, which permits a longer residence time. Although the concept shown in the embodiment of the drawing will be the suitable for many installations, it should not be considered limiting.

In new units, the use of a multi-stage MW/Sonic stripper, with the ability to remove stripped products at multiple points in the stripping operation, is highly preferred. With the ability to selectively heat hydrocarbons, and/or sulfur, and nitrogen compounds afforded by embodiments of the present invention, use of extremely short residence time stripping is now possible. Stripping techniques heretofore used to de-water paper pulp are now applicable to catalytic stripping processes. By this is meant that the catalyst, after microwaving, could be passed over relatively large cross-sectional area surfaces with a vacuum on one side of the surface to aid in stripping operation. Porous stainless steel filters can be used. In another embodiment, annular flow of catalyst around a porous stainless steel filter can be used to strip hydrocarbons and/or sulfur and nitrogen compounds from catalyst which has been exposed MW/Sonic stripper.

Cracked products and stripper effluent vapors are combined to form a produced mixture. The produced mixture is withdrawn from reaction zone [100] by conduit [114]. Stripped catalyst containing coke is withdrawn via conduit [122] and charged to regeneration zone [120]. The flow rate of the stripped catalyst is controlled using stripped catalysts control valve [134]. The catalyst is regenerated by contact with a regeneration gas [124]. Regeneration gas [124] is an oxygen-containing gas, usually air. Flue gas is withdrawn from the regenerator by line [126]. Catalyst circulates from coke combustor [128] to second dense bed [130]. Some catalyst is recycled to the base of coke combustor [128] via line [132].

Conditions in fractionator [140] can be conventional. Usually the produced mixture will be preheated to about 150° C. to 375° C. In one embodiment, regeneration zone [120] operates at about 650° C. to 750° C. and the catalyst to feed weight ratio is usually about 4:1 to 8:1, adjusted as necessary to hold a desired reaction zone outlet temperature usually about 450° C. to 550° C.

Produced mixture from the FCC unit passes via line [114] to fractionator [140], where produced mixture is separated into a heavy, slurry oil stream [142], heavy cycle oil [144], light cycle oil [146], naphtha [148], and a light overhead stream [150]. The light overhead stream [150] is rich in $C_2$-$C_4$ olefins, $C_1$-$C_4$ saturates, and other light cracked gas components. This light stream is usually treated in an unsaturated gas plant to recover various light gas streams, including $C_3$-$C_4$ LPG, and optionally $C_2$-fuel gas or the like.

In embodiments of the present invention, control valves [106, 134, and 136] are operatively coupled with DCS [10] in order to control the flow rates of their respective streams. In another embodiment, all input streams are fitted with sensors as well control valves (not all control valves and sensors are shown in FIG. 4). The sensors are operable to measure the flow rates and temperatures of their respective stream. Moreover, the sensors are operatively coupled with DCS [10] as shown by the dashed lines.

Having described the invention with reference to particular compositions, theories of effectiveness, etc., it will be apparent to those of ordinary skill in the art that it is not intended that the invention be limited by such illustrative embodiments or mechanisms, and that modifications can be made without departing from the scope or spirit of the invention, as defined by the appended claims. It is intended that all such obvious modifications and variations be included within the scope of the present invention as defined in the appended claims. The claims are meant to cover the claimed components and steps in any sequence which is effective to meet the objectives there intended, unless the context specifically indicates to the contrary. The specific process examples herein disclosed are to be considered as being primarily illustrative. Various changes beyond those described will no doubt occur to those of ordinary skill in the art; and such changes are to be understood as forming a part of this invention insofar as they fall within the spirit and scope of the claims.

What is claimed is:

1. A process for the fluid catalytic cracking of a hydrocarbon feedstock comprising the steps of:
   (a) reacting the hydrocarbon feedstock with a catalyst mixture, said catalyst mixture comprising between about 60-90% by weight of a base cracking catalyst and between about 5-40% by weight of an additive comprising a shape selective zeolite, in a continuous fashion in a reaction zone under reaction conditions to form a produced mixture, the produced mixture comprising a product stream and a spent stream, the catalyst mixture comprising a base cracking catalyst, an ultrastable Y-type zeolite, an unreacted catalyst stream, and a regenerated catalyst stream, the catalyst mixture having a catalyst mixture feed rate, the hydrocarbon feedstock having a hydrocarbon feedstock feed rate, the produced mixture having a produced mixture flow rate, wherein the reaction zone comprises:

(i) flow rate sensors that are operable to monitor the hydrocarbon feedstock feed rate, the catalyst mixture feed rate, and the produced mixture flow rate;
(ii) temperature sensors that are operable to measure a reaction zone temperature;
(iii) control valves that are in communication with a process control system such that the process control system is operable to modify an amount of closure of the control valves such that the hydrocarbon feedstock feed rate, the catalyst mixture feed rate and the produced mixture flow rate are subject to manipulation; and
(iv) a reactor;
wherein the reaction conditions comprise:
(i) an operating temperature; and
(ii) a contact time of approximately 0.1 to 1 seconds;
(b) separating the produced mixture into the product stream and the spent stream, the spent stream comprising spent catalyst and unreacted hydrocarbon;
(c) separating the spent stream into spent catalyst and unreacted hydrocarbon;
(d) transferring the spent catalyst to a regeneration zone, wherein the regeneration zone comprises a catalyst regenerator, the regeneration zone having a regeneration zone temperature;
(e) regenerating the spent catalyst in the regeneration zone using an oxidation treatment to produce the regenerated catalyst stream, the regenerated catalyst stream having decreased amounts of adsorbed material as compared to the spent catalyst, the spent catalyst having a spent catalyst flow rate, and the spent catalyst having a residence time within the regeneration zone;
(f) recycling in a continuous fashion the regenerated catalyst stream into the reaction zone, the regenerated catalyst stream having a recycled regenerated catalyst flow rate;
(g) separating and collecting the product stream from the spent catalyst and unreacted hydrocarbon in a stripping zone;
(h) withdrawing a stream comprising the product stream and the unreacted hydrocarbon from the stripping zone; and
(i) recycling at least a portion of the product stream from the stream withdrawn from the stripping zone, through a separation zone before sending the recycled portion of the product stream to the reaction zone,
wherein the process has operating conditions, the operating conditions are operable to be controlled by the process control system, wherein the process control system has control parameters, the control parameters comprising the steps of:
(i) obtaining predetermined process models that are operable to simulate operating conditions and produce simulated propylene production and simulated energy usage for the fluid catalytic cracking unit, wherein each predetermined process model is developed to simulate the fluid catalytic cracking unit for a specific range of the operating conditions;
(ii) monitoring, in real-time, feed data, products characterization data, and operating conditions;
(iii) selecting, in real-time, one of the predetermined process models based on the monitored, real-time feed data, monitored products characterization data and monitored operating conditions;
(iv) calculating simulated-optimized-operating-conditions using the selected predetermined process model;
(v) adjusting the operating conditions to correspond with the simulated-optimized-operating-conditions;
(vi) measuring a propylene concentration in the product stream;
(vii) measuring energy usage of the fluid catalytic cracking unit;
(viii) comparing the propylene concentration with a predetermined propylene concentration range to determine whether the propylene concentration falls within the predetermined propylene concentration range;
(ix) comparing the energy usage of the fluid catalytic cracking unit with a predetermined energy usage range to determine whether the energy usage falls within the predetermined energy usage range; and
(x) adjusting the operating conditions until propylene concentration falls within the predetermined minimum propylene specification to yield optimized propylene production, wherein optimized propylene production is determined by maximizing a ratio of propylene production over energy usage, wherein energy usage is the energy consumed by the fluid catalytic cracking unit.

2. The process of claim 1, further comprising a microwave generator having a microwave frequency, wherein the operating conditions comprise the reaction zone temperature, the catalyst mixture feed rate, the hydrocarbon feedstock feed rate, the regeneration zone temperature, the recycled regenerated catalyst stream flow rate, the contact time within the reaction zone, the residence time within the regeneration zone, catalyst design, and the microwave frequency.

3. The process of claim 1, wherein in the stripping zone, a majority of adsorbed material covering the spent catalyst is removed prior to transferring the spent catalyst to the regeneration zone.

4. The process of claim 3, wherein the majority of adsorbed material covering the spent catalyst is removed by applying microwaves and/or sonic radiation in a dense phase region of the stripper.

5. The process of claim 1, wherein the catalyst mixture is maintained in a fluidized state.

6. The process of claim 1, wherein step (e) is performed using heat.

7. The process of claim 1, wherein step (e) is performed using microwaves.

8. The process of claim 1, wherein step (e) is performed using sonications.

9. The process of claim 1, further comprising recycling the unreacted hydrocarbon to the reaction zone.

10. The process of claim 1, wherein the hydrocarbon feedstock comprises a heavy fraction oil, such that the heavy fraction oil is characterized by having a boiling point, at atmospheric pressure, of about 250° C. and higher.

11. The process of claim 1, wherein the hydrocarbon feedstock is selected from the group consisting of straight-run gas oil, vacuum gas oil, atmospheric residue, coker gas oil, petroleum oils obtained by hydrofining or hydrotreating atmospheric residue and gas oil, and combinations thereof.

12. The process of claim 1, further comprising a cracker riser and a medium pore zeolite catalytic component.

13. The process of claim 1, wherein the reactor within the reaction zone is an up flow-type reactor.

14. The process of claim 1, further comprising a microwave generator having a microwave frequency, wherein the operating conditions are selected from the group consisting of the reaction zone temperature, the catalyst mixture feed rate, the hydrocarbon feedstock feed rate, the regeneration zone temperature, the recycled regenerated catalyst stream flow rate, the contact time within the reaction zone, the residence time within the regeneration zone, catalyst design, and a microwave frequency.

15. The process of claim 1, wherein the catalyst comprises:
   a base cracking catalyst, said base cracking catalyst being present in a range of 60 to 95% by weight;
   an additive comprising a shape-selective zeolite, said additive being present in a range of 5 to 40% by weight;
   a binder comprising an inorganic refractory metal oxide; and
   wherein said base cracking catalyst or said additive can include between about 0.5 and 10% by weight phosphorous.

16. The process of claim 1, wherein the catalyst has a bulk density of 0.5 to 1.0 g/mL, an average particle diameter of 50 to 90 microns, a surface area of 50 to 350 m2/g, and a pore volume of 0.05 to 0.5 mL.

17. The process of claim 1, wherein the reaction time is in the range of 0.2 to 0.7 seconds and the reaction zone outlet temperature is between 590° C. and 620° C.

18. The process of claim 4, wherein the microwaves or sonications are provided in multiple stages.

* * * * *